United States Patent
Van Es et al.

(10) Patent No.: US 11,927,564 B2
(45) Date of Patent: Mar. 12, 2024

(54) CANTILEVER, ULTRASOUND ACOUSTIC MICROSCOPY DEVICE COMPRISING THE CANTILEVER, METHOD OF USING THE SAME AND LITHOGRAPHIC SYSTEM INCLUDING THE SAME

(71) Applicant: Nederlandse Organisatie voor toegepast-natuurwetenschappelijk onderzoek TNO, 's-Gravenhage (NL)

(72) Inventors: Maarten Hubertus Van Es, Voorschoten (NL); Abbas Mohtashami, 's-Gravenhage (NL); Benoit Andre Jacques Quesson, 's-Gravenhage (NL); Paul Louis Maria Joseph Van Neer, Bergschenhoek (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 265 days.

(21) Appl. No.: 17/426,588

(22) PCT Filed: Feb. 3, 2020

(86) PCT No.: PCT/NL2020/050055
§ 371 (c)(1),
(2) Date: Jul. 28, 2021

(87) PCT Pub. No.: WO2020/162743
PCT Pub. Date: Aug. 13, 2020

(65) Prior Publication Data
US 2022/0091069 A1    Mar. 24, 2022

(30) Foreign Application Priority Data
Feb. 4, 2019 (EP) .................................. 19155361

(51) Int. Cl.
*G01N 29/06* (2006.01)
*G01N 29/036* (2006.01)
(Continued)

(52) U.S. Cl.
CPC ....... *G01N 29/0681* (2013.01); *G01N 29/036* (2013.01); *G01Q 60/32* (2013.01);
(Continued)

(58) Field of Classification Search
CPC ....... G01N 29/0681; G01N 2291/0427; G01N 29/036; G01N 2291/014; G01Q 60/32; G01Q 70/06; G01Q 70/10; G01Q 80/00
(Continued)

(56) References Cited

U.S. PATENT DOCUMENTS 6,079,255 A   6/2000 Binnig et al.
6,196,061 B1  3/2001 Adderton et al.
(Continued)

FOREIGN PATENT DOCUMENTS

EP   3349018 A1   7/2018
EP   3385725 A1   10/2018

OTHER PUBLICATIONS

European Patent Office, International Search Report in corresponding International Application No. PCT/NL2020/050055 dated Apr. 20, 2020 (2 pages).

*Primary Examiner* — Lisa M Caputo
*Assistant Examiner* — Rose M Miller
(74) *Attorney, Agent, or Firm* — Leydig, Voit & Mayer, Ltd.

(57) ABSTRACT

A cantilever (30) for an ultrasound acoustic microscopy device is provided comprising a transmission tip (31) to contact a sample (11) to therewith transmit an ultrasound acoustic signal as an ultrasound acoustic wave into the sample. The cantilever further comprises a reception tip (32)
(Continued)

separate from the transmission tip (31) to contact the sample to receive an acoustic signal resulting from reflections of the ultrasound wave from within the sample.

20 Claims, 9 Drawing Sheets

(51) Int. Cl.
*G01Q 60/32* (2010.01)
*G01Q 70/06* (2010.01)
*G01Q 70/10* (2010.01)
*G01Q 80/00* (2010.01)

(52) U.S. Cl.
CPC ............. *G01Q 70/06* (2013.01); *G01Q 70/10* (2013.01); *G01Q 80/00* (2013.01); *G01N 2291/014* (2013.01); *G01N 2291/0427* (2013.01)

(58) Field of Classification Search
USPC .......................................................... 73/606
See application file for complete search history.

(56) References Cited

U.S. PATENT DOCUMENTS

| | | | | |
|---|---|---|---|---|
| 6,389,885 B1* | 5/2002 | Arnold | ................... | G01Q 60/32 73/105 |
| 8,381,311 B2* | 2/2013 | Jahnke | ................... | G01Q 70/06 850/13 |
| 9,291,639 B2* | 3/2016 | Su | ........................ | B82Y 35/00 |

* cited by examiner

CANTILEVER, ULTRASOUND ACOUSTIC MICROSCOPY DEVICE COMPRISING THE CANTILEVER, METHOD OF USING THE SAME AND LITHOGRAPHIC SYSTEM INCLUDING THE SAME

CROSS-REFERENCE TO RELATED APPLICATIONS

This patent application is a U.S. National Phase of PCT International Application No. PCT/NL2020/050055, filed Feb. 3, 2020, which claims priority to European Application No. 19155361.9, filed Feb. 4, 2019, which are both expressly incorporated by reference in their entireties, including any references contained therein.

BACKGROUND OF THE INVENTION

Field of the Invention

The present invention relates to a cantilever.

The present invention also relates to an ultrasound acoustic microscopy device comprising the cantilever.

The present invention further relates to a method using an ultrasound acoustic microscopy device.

The present invention still further relates to a lithographic system including an ultrasound acoustic microscopy device.

Related Art

Ultrasound acoustical imaging is a powerful tool for use in semiconductor applications to facilitate alignment of layers, and to detect defects that arise during production of lithographic devices or for quality control of the finished product. In some cases, such lithographic products may have considerable thickness. For example, 3D NAND devices, introduced as a next generation memory may comprise 100s of layers with a total thickness of few micrometers. To enable imaging with sufficient resolution, relatively high frequencies are required to generate an acoustic wavefront that can penetrate deep into the sample under investigation, to be reflected by subsurface structures or defects to be located. Imaging is based in the information contained in the reflected waves.

SUMMARY

It is an object of the present disclosure to increase signal level and/or avoid a limitation of the dynamic range while at least partially avoiding a reduction in scanning speed. This object is achieved with an improved cantilever for an ultrasound acoustic microscopy device.

The improved cantilever as claimed in claim 1 of this disclosure comprises a transmission tip to contact a sample to therewith transmit an ultrasound acoustic signal as an ultrasound acoustic wave into the sample. The improved cantilever further comprises a reception tip separate from the transmission tip to contact the sample to receive an acoustic signal resulting from reflections of the ultrasound wave from within the sample.

The claimed ultrasound acoustic microscopy device comprises a sample carrier, a signal generator, a scanning head holding the improved cantilever, a signal processor and a scanning mechanism.

The signal generator is to generate an actuation signal having a frequency of at least 1 GHz to be converted into the ultrasound acoustic signal for transmission into the sample.

Various options are possible for this actuation signal into acoustic signal conversion. According to one option the conversion takes place with a piezo based transducer. According to another option, conversion into an ultrasound acoustic signal is achieved by thermally induction with optical radiation. Therewith a modulated, e.g. pulsed, laser beam is directed towards the tip or towards a position of the cantilever carrying the tip, therewith inducing a rapid periodical thermal expansion, resulting into the ultrasound acoustic signal to be transmitted by the tip as a soundwave into the sample. It has been found feasible at present to achieve acoustic signal frequencies as high as 100 GHz. In case of direct thermal induction, even higher frequencies, e.g. in the order of magnitude of a few THz have been reported. However, a higher lateral resolution is achievable when the soundwaves are indirectly transmitted into the sample via the tip.

The scanning mechanism is to displace the scanning head relative to the sample, along the surface of the sample. To this end, the scanning mechanism may for example displace the scanning head along the surface of the sample in a contact mode or in a peak force tapping mode.

The signal processor is to generate an image signal in response to the sensor signal ($S_{sense}$) generated in response to the received acoustic signal.

By providing the cantilever with separate tips for transmission of the acoustic wavefront into the sample and for receiving acoustic waves reflected from features within the sample the sensitivity of the ultrasound acoustic microscopy device can be improved in various ways.

In an embodiment, the ultrasound acoustic microscopy device may be operated in a continuous mode, wherein the transmission tip transmits the ultrasound wavefront continuously while scanning the sample. This is favorable for a high scanning speed, Alternatively, the ultrasound acoustic microscopy device may be operated in a pulsed mode, wherein the transmission tip transmits the ultrasound wavefront as mutually distinct pulses. In this way disturbance of the detected signal by other acoustic signals not resulting from reflections in the sample, e.g. conducted along the surface of the sample are avoided.

In an embodiment, the reception tip receives the reflections as the acoustic signal to be converted into the sensor signal. In this embodiment the reflected ultrasound waves are directly converted into a sensor signal to be processed. Due to the fact that the separate tips are used to transmit and to receive, these tips and associated elements can be optimized for their proper function. For example, in an embodiment with piezo electric elements, a piezo electric element of a first piezo electric material may be used for generating the ultrasound acoustic signal and a piezo-electric element of a second piezo electric material, different from the first piezo electric material may be used for conversion of received acoustic signals into an electric signal. Additionally or alternatively, the geometrical shape of a transmitting element and a receiving element may be optimized to their function. For example a resonance (mode shape) based design may be selected to induce acoustic waves in a narrow frequency band. Examples thereof and associated analytical solutions are provided in Nad, Ultrasonic horn designed for ultrasonic machining technologies, Appl. Comp. Mech. 4: 79-88, 2010 and further in Shu et al, "On the design and analysis of acoustic horns for ultrasonic welding", Trans. Can. Soc Mech. Eng., 37(3):905-913, 2013. Such actuators may provide for high one-way gain factors, e.g. in the range of 2-16. It is noted that a relatively high contact pressure is advantageous for achieving a high gain.

According to a different approach, a geometric focusing based design is used. Such a design, having similarity with a reversed acoustic horn, provides for a relatively broad frequency band. Optimally the tip-size is in the same order of magnitude of the wavelength of the acoustic signal which is to be generated.

As a further option, aspects like a cantilever stiffness and a tip sharpness of the transmission tip and of the reception tip may be individually adapted. For example the improved cantilever may have a cantilever branch of a relatively low stiffness for the reception tip, so as to give a strong deflection in response to forces acting thereon. The improved cantilever may have a cantilever branch of a relatively high stiffness for the transmission tip, to provide for a large contact area.

In order to optimize the transmission and the reception, various sensing methods may be contemplated to sense the state of the cantilever, or its branches. A cantilever or cantilever branch may for example be provided with an integrated read-out sensor, such as a deflection measurement pad. Alternatively, cantilever (branch) deflection can be measured by an optical beam deflection (OBD) method. For example, each cantilever branch may be monitored by a respective OBD-device. Alternatively, a plurality of cantilever branches may be monitored by a shared OBD-device which has a steering mirror that alternately directs the optical beam to one of the cantilever branches to be monitored.

Still further the cantilever branches of the transmitting element and the receiving element may be individually controlled using the sense signals indicative for their state for example using integrated control, electrostatic control, laser-heating based control or a combination thereof.

For example, different cantilever branches may be controlled to different contact forces/interaction regimes (attractive regime!) for optimizing send/receive and e.g. up or down mixing. Receiving may be done for example in a purely attractive (non-contact) interaction regime.

In an embodiment elements for transmission and reception have a mutually different resonance frequency. In this way, the bandwidth of the system, which is determined by the combined properties of the elements for transmission and for reception is increased. This is in particular advantageous in a pulse wise operational mode. A transmission element and a receiving element may for example have a peak resonance at a frequency of 10.5 GHz and 12.5 GHz respectively.

As an alternative for a direct detection of the reflected ultrasound acoustic waves, another embodiment is provided wherein the signal generator is to generate a further actuation signal having a further frequency of at least 1 GHz, different from the frequency with which the transmission tip is actuated. In this embodiment, the acoustic signal to be converted is a difference acoustic signal having a frequency corresponding to a difference in the frequency with which the transmission tip is actuated and the further frequency, which is used to actuate the reception tip. As a result of a non-linear interaction of the reflected waves with the further ultrasound signal generated in response to the further actuation signal a downmixing occurs in the contact area of the sample with the reception tip. Therewith a difference acoustic signal having a relatively low frequency corresponding to the difference between the frequency and the further frequency and having an amplitude and phase depending on the reflected acoustic signals results. This relatively low frequency signal can be detected for example by measuring deflection of a cantilever (branch) that carries the receiving element, e.g. by a reflected laserbeam, and by a subsequent demodulation using a reference difference signal. In this heterodyne approach, the presence of the reception tip separate from the transmission tip enables an embodiment, wherein a pressure exerted by the reception tip is lower than a pressure exerted by the transmission tip. The relatively high pressure exerted by the transmission tip provides for a good acoustical coupling between that transmission tip and the sample, while the relatively low pressure of the reception tip provides for a high non-linearity in the coupling between the reception tip and the sample. This contributes to a high signal to noise ratio in the demodulated signal.

Also in this heterodyne approach, the ultrasound acoustic microscopy device may either be operated in a continuous mode in favor of a high scanning speed, or alternatively, in a pulsed mode, to reduce disturbance of the detected signal by other acoustic signals not resulting from reflections in the sample, e.g. conducted along the surface of the sample.

Regardless the mode of operation, it is favorable to include more than one reception tip. With such a combination of reception tips it is rendered possible to better reconstruct the sub-surface features using various approaches. For example, the various reception tips may be configured to sense mutually different harmonics of the excitation signal. Additionally or alternatively, the various reception tips may be configured to sense mutually different wave modes created by diffraction/interaction with the buried features.

It is noted that where reference is made to a cantilever in this application, alternatively other force transducers may be used instead. Such other force transducers are for example tuning forks, membranes and other flexible structures.

Various exemplary cantilever arrangements suitable for accommodation into a scanning head are disclosed herein to combine the transmission tip and the reception tip(s). In some embodiments the transmission tip and the reception tip(s) may be arranged on a common surface of a cantilever. It is an advantage of these embodiments that it can be provided relatively by growing additional tip(s) on the cantilever near the 'normal' AFM-tip. In order to sense the contact of each of the tips with the sample, one or more deflection sensors may be provided on the cantilever that provide a sense signal indicative for cantilever torsion, i.e. lateral deflection of the cantilever as opposed to longitudinal deflection. The combination of the torsion sense signal and the longitudinal deflection signal (out-of-plane top-bottom signal) can then be used to determine the contact of both tips simultaneously. In an embodiment, the cantilever is provided in the form of a triangle wherein one of the sides forms a common base portion and wherein the top of the triangle carries the transmission tip and the reception tip. The AFM deflection measurement pad is preferably arranged symmetrically with respect to the transmission tip and the reception tip. The symmetric arrangement facilitates the computation of the contact of each of the tips on the cantilever with the sample. In another embodiment, the cantilever is provided as a T-shaped element, at a free end branching in mutually opposite directions wherein a first branch carries the transmission tip at its end and a second branch carries the reception tip at its end. Similarly, the AFM deflection measurement pad is preferably arranged symmetrically with respect to the transmission tip and the reception tip.

In further embodiments the transmission tip and the reception tip are accommodated on a surface of a respective cantilever branch facing in a direction of the carrier that is to carry the sample. It is an advantage of these embodiments that not only the properties of the tips can be individually adapted, but that furthermore the properties of the cantilever branches can be individually adapted and that their operational state, e.g. contact force can be individually controlled. In one such embodiment, the cantilever is provided in the form of a triangle wherein one of the sides forms a common base portion. Contrary to the embodiment referred to above, however the legs of the triangle that extent as branches from the common base portion are separate from each other at their ends, where they respectively carry the transmission tip and the reception tip. Also this embodiment can be manufactured relatively easily. Starting from the closed triangle form referred to above, the triangle legs extending from the common base portion can be separated from each other at their ends, for example by a focused ion beam (FIB) method. Therewith the triangle leg carrying the transmission tip and the triangle leg carrying the reception tip are mechanically decoupled from each other. This is particular important in embodiments using heterodyne operation, relying on down-mixing in the contact area with the sample. Due to the geometry wherein the triangle legs extend in an oblique direction, a relatively complicated signal analysis is necessary to compute the vertical deflection of a cantilever branch.

In an further embodiment, wherein a cantilever comprises separate cantilever branches for the transmission tip and the reception tip, the branches are formed as mutually separated portions of a side of a quadrilateral, such as a rectangle. The side of the quadrilateral is disconnected at a position between its ends joining a respective further side coupled to a common side. The transmission tip and the reception tip are arranged at a respective free end of a respective separated portion. In this embodiment the properties of the cantilever branches can be easily adapted individually for optimization of the functioning of the transmission tip and of the reception tip. For example by having the separation at a position distant from a middle of the side, one of the cantilever branches has a relatively high stiffness which is advantageous for a transmission tip and the other one has a relatively low stiffness, which is favorable for use in combination with a reception tip that relies on a non-linear interaction with the sample to provide for down-conversion. Also this embodiment is favorable in that it allows for a mutually independent sensing of deflections of a cantilever branch in a vertical direction and in directions transverse thereto. Control means may be provided to control an angle of the cantilever branches respective to the sample. Separate OBD systems may be provided to measure the deflection of the cantilever branches. Alternatively deflection sensing means may be integrated with the cantilever branches for this purpose.

As noted above, a plurality of reception tips may be provided, in order to better reconstruct the sub-surface features using various approaches. In one example a cantilever is provided, which is a modification of the quadrilateral shaped cantilever, in that it additionally comprises a further cantilever branch that extends from the common side and between the free ends of the other two cantilever branches. A symmetric arrangement may be provided, wherein the additional cantilever branch carries at its free end a transmission tip and the other two cantilever branches each carry a reception tip. As noted above, the reception tips may be configured to sense mutually different harmonics of the excitation signal. Additionally or alternatively, the reception tips may be configured to sense mutually different wave modes created by diffraction/interaction with the buried features.

BRIEF DESCRIPTION OF THE DRAWINGS

These and other aspects are described in more detail with reference to the drawings. Therein.

DETAILED DESCRIPTION OF EMBODIMENTS

Like reference symbols in the various drawings indicate like elements unless otherwise indicated.

Figure 1:
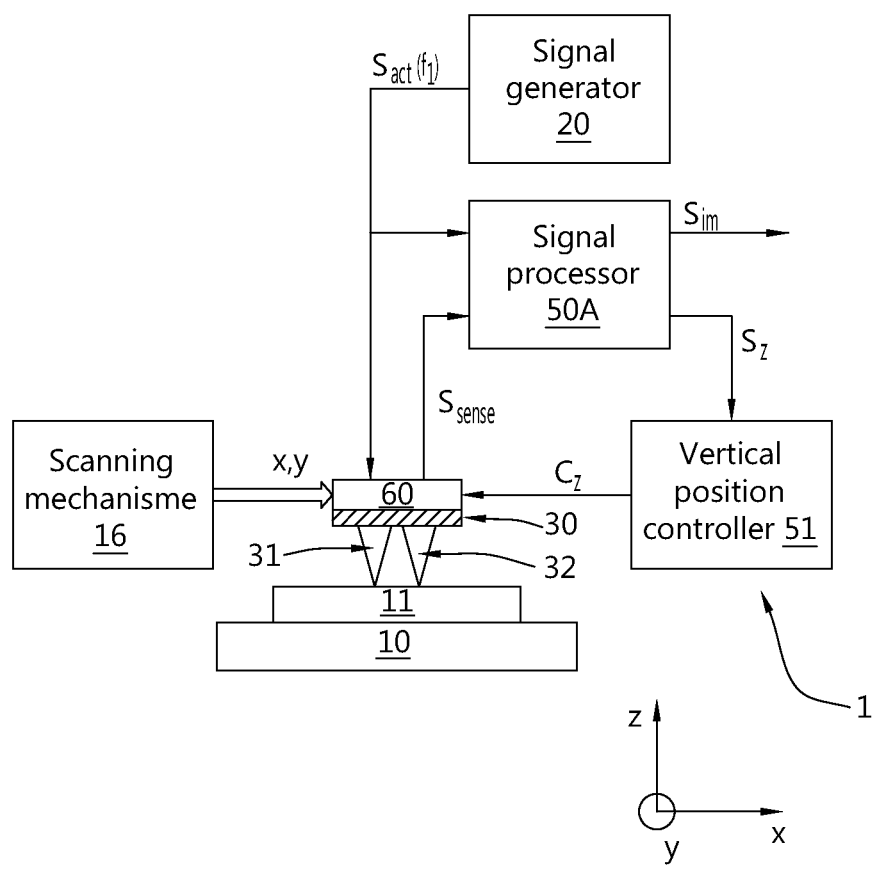
FIG. 1 schematically shows a first embodiment of an ultrasound acoustic microscopy device.

FIG. 1 schematically shows a first embodiment of an ultrasound acoustic microscopy device 1. The ultrasound acoustic microscopy device 1 shown in FIG. 1 comprises a sample carrier 10, a signal generator 20, a scanning head 60, a signal processor 50A and a scanning mechanism 16.

The carrier 10 is provided to carry a sample 11 to be inspected. The sample 11 is for example a semi-finished- or completed semiconductor product. For a semi-finished semiconductor product it may be desired to exactly determine the placement of earlier formed structures in order to properly align further layers. In the case of a completed semiconductor product it may be desired to verify if it complies with quality requirements. Such a verification may also be applied to semi-finished products. In this way malfunctions of the semiconductor manufacturing process can be rapidly detected and corrected.

The signal generator 20 is provided to generate an actuation signal $S_{act}$ having a frequency $f_1$ of at least 1 GHz. As schematically shown in FIG. 1, and shown in more detail in one of FIGS. 3-8, the scanning head 60 is provided with a cantilever 30 that comprises a transmission tip 31 to contact the sample 11 to therewith transmit an ultrasound acoustic signal generated in response to the actuation signal, as an ultrasound acoustic wave into the sample. The cantilever further comprises a reception tip 32 separate from the transmission tip to contact the sample to receive an acoustic signal resulting from reflections of the ultrasound wave from within the sample.

The signal processor 50A is to generate an image signal $S_{im}$ in response to a sensor signal $S_{sense}$ obtained by conversion of the received acoustic signal. In the embodiments shown in FIGS. 1, 3, 5, 7 and 8 a receiving element associated with the reception tip 32 directly converts the reflected acoustic signal into the sensor signal (Ssense).

The image signal $S_{im}$ contains the information representative for subsurface features extracted from the sensor signal $S_{sense}$—In this embodiment the signal processor 50A extracts the image signal by down-mixing the sensor signal $S_{sense}$ with the actuation signal $S_{act}$. The signal processor 50A also provides an input signal $S_z$, for a vertical position controller 51 that controls a vertical position of the scanning head 60 with respect to the surface of the sample 11 using a control signal $C_z$.

Figure 2:
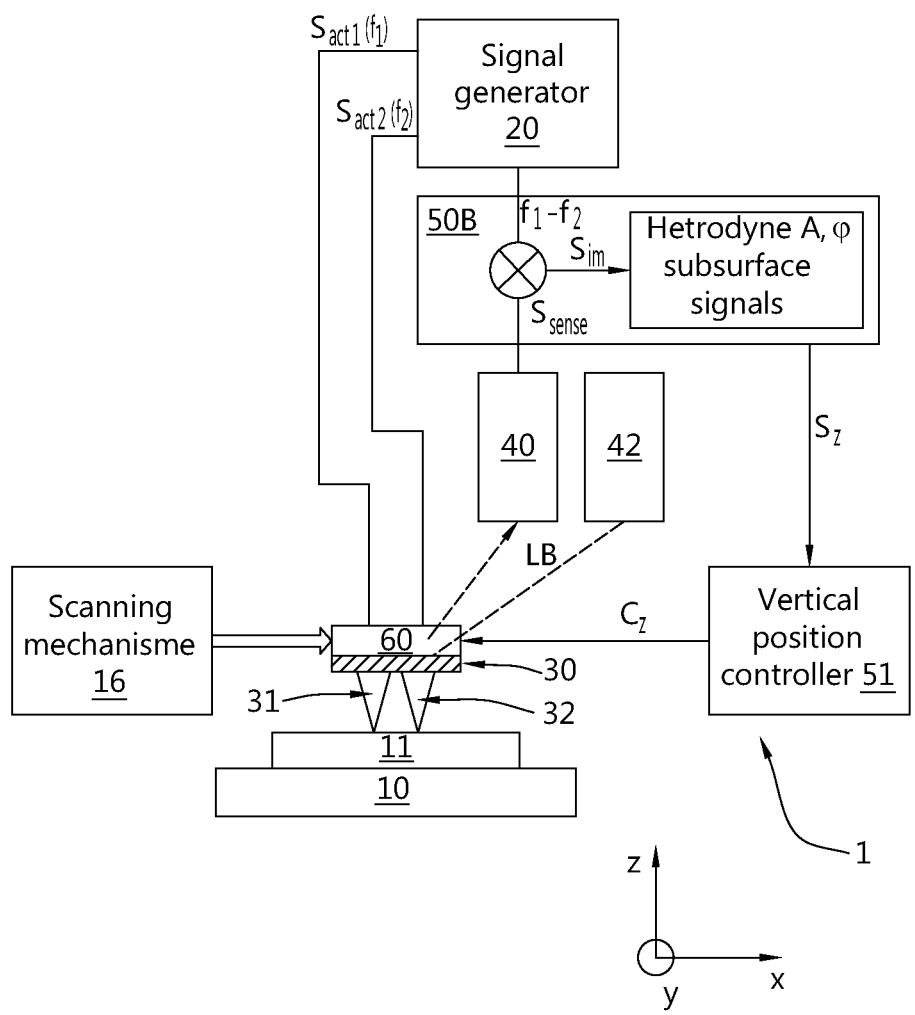
FIG. 2 schematically shows a second embodiment of an ultrasound acoustic microscopy device.

The scanning mechanism 16 is to displace the scanning head 60 in the plane xy relative to the sample, along the surface of the sample. Therewith the vertical position controller 51 is provided to control the vertical position of the scanning head 60 with respect to the sample surface of the sample during this displacement, for example in a contact mode or in a peak force tapping mode, FIG. 2 shows a second embodiment and parts thereof are shown in more detail in FIGS. 4 and 6. In the embodiment of FIG. 2, the signal generator 20 generates a further actuation signal $S_{act2}$ having a further frequency $f_2$ of at least 1 GHz, that is different from the frequency $f_1$ of the actuation signal $S_{act1}$. In this embodiment the acoustic signal $S_{sense}$ to be received by the reception tip 32 is a difference acoustic signal having a frequency corresponding to a difference between the frequencies f1, f2 of the actuation signals $S_{act1}$ and $S_{act2}$ respectively. The difference acoustic signal results from a non-linear interaction of the ultrasound signal generated in response to the actuation signal $S_{act1}$, reflected within the sample and a further ultrasound signal generated in response to the further actuation signal $S_{act2}$. The difference acoustic signal has a relatively low frequency as compared to the frequency $f_1$, $f_2$ of each of the actuation signals. The frequency of the difference acoustic signal as determined by the absolute value of the difference between the frequencies $f_1$, $f_2$ may for example be in the range of 0.01-10 MHz. Due to its relatively low frequency range, the difference acoustic signal can be sensed relatively easily, for example by sensing vibration of a suspension element, e.g. a cantilever branch 36, to which the reception tip 32 is attached. In the embodiment shown, this is achieved by a sensor 42, which senses a position to which a laser beam LB from a laser 40 is reflected by a surface of the cantilever branch 36. Alternatively the difference acoustic signal may be sensed by other means, e.g. by a piezo-electric element.

The signal processor 50B applies a heterodyne detection to the sense signal $S_{sense}$ using a difference signal $S_{diff}$ provided by the signal generator 20 to render the image signal $S_{im}$.

Returning now to the embodiment of FIGS. 1, 3, 5 and 7 it is the case that a receiving element associated, i.e. acoustically coupled, with the reception tip 32 has to be capable to directly convert the acoustic signal resulting from the reflections of the ultrasound signal within the sample 11.

Due to the fact that the cantilever 30 in the scanning head 60 comprises the transmission tip 31 and the reception tip 32 as mutually separate tips, these tips and associated elements can have a mutually different construction to individually optimize them to their respective function. According to one option the transmission tip 31 and its associated element on the one hand and the reception tip 32 and its associated elements on the other hand have a mutually different resonance frequency. For example they have a peak resonance at a frequency of 10.5 GHz and 12.5 GHz respectively. As a result, the resulting combined transmission band is broader than would be the case if their peak resonances were the same. This is of particular relevance for pulse mode operation. Piezo electric elements may be used for this purpose, which are constructed of mutually different piezo electric materials and/or which have mutually different dimensions, e.g. have mutually different thickness.

Figure 4:
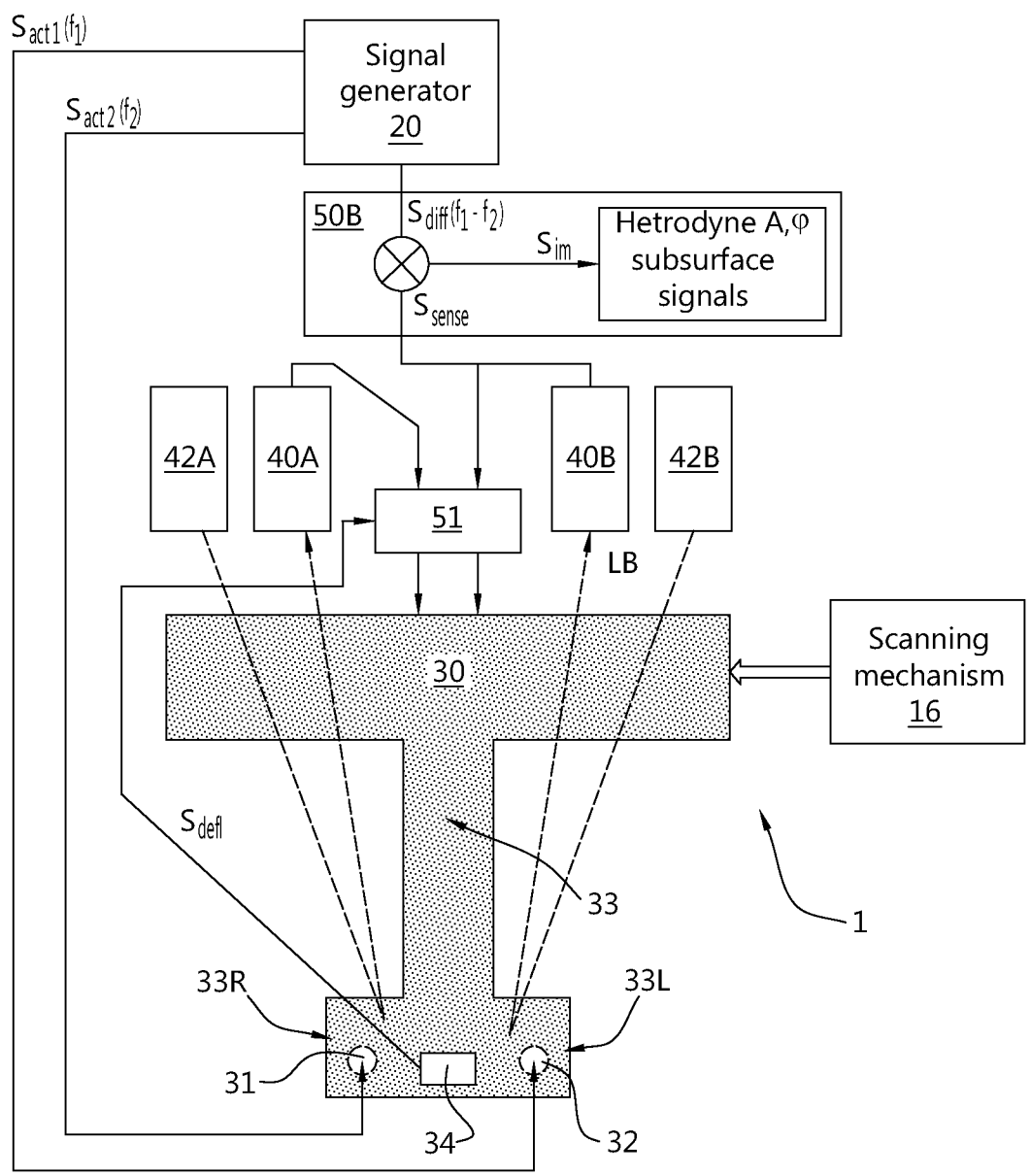
FIG. 4 schematically shows a fourth embodiment of an ultrasound acoustic microscopy device.
Figure 6:
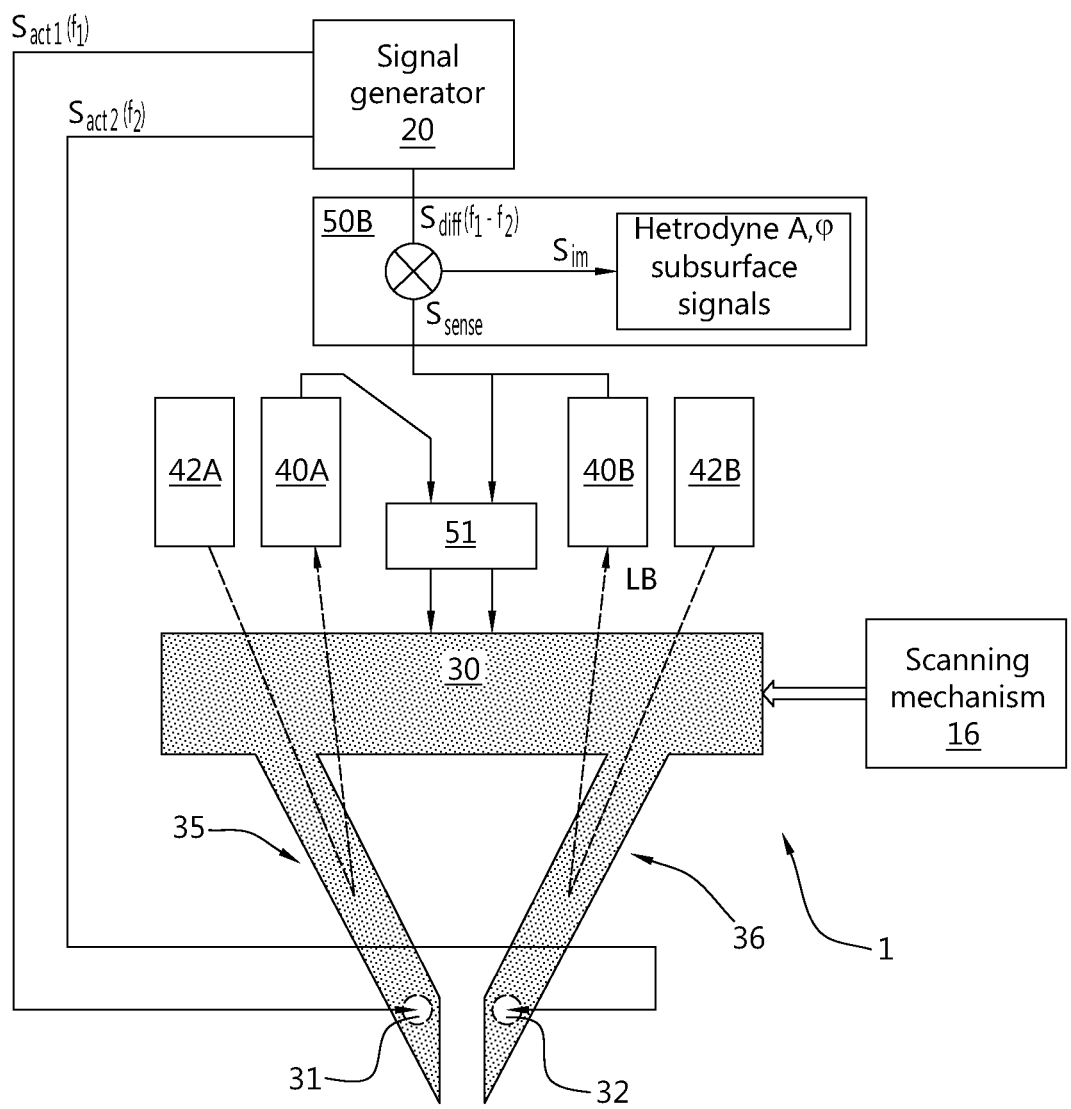
FIG. 6 schematically shows a sixth embodiment of an ultrasound acoustic microscopy device.

Also in the case illustrated in FIGS. 2, 4 and 6 wherein the acoustic signal to be converted is a difference signal, the provision of the transmission tip 31 and the reception tip 32 as mutually separate elements is advantageous. In particular, therewith it can be achieved that a pressure exerted by the reception tip 32 is lower than a pressure exerted by the transmission tip 31. The relatively high pressure exerted by the transmission tip 31 provides for a good acoustical coupling between that transmission tip and the sample, whereas the relatively low pressure of the reception tip 32 provides for a high non-linearity in the coupling between the reception tip and the sample.

In the embodiments presented in FIGS. 5-8, the transmission tip and the reception tip 31, 32 are accommodated on a surface of a respective cantilever branch 35, 36 facing in a direction of the carrier 10. This is advantageous in that the design of the cantilever branches can contribute to an independent optimization of the transmission function and the receiving function.

Nevertheless, it may be desired to use a common cantilever surface, shared by the transmission tip and the reception tip. An ultrasound acoustic microscopy device 1 having a scanning head 60 equipped with a cantilever with a common cantilever 33 surface for the transmission tip 31 and the reception tip 32 is shown in FIGS. 3 and 4.

Figure 3:
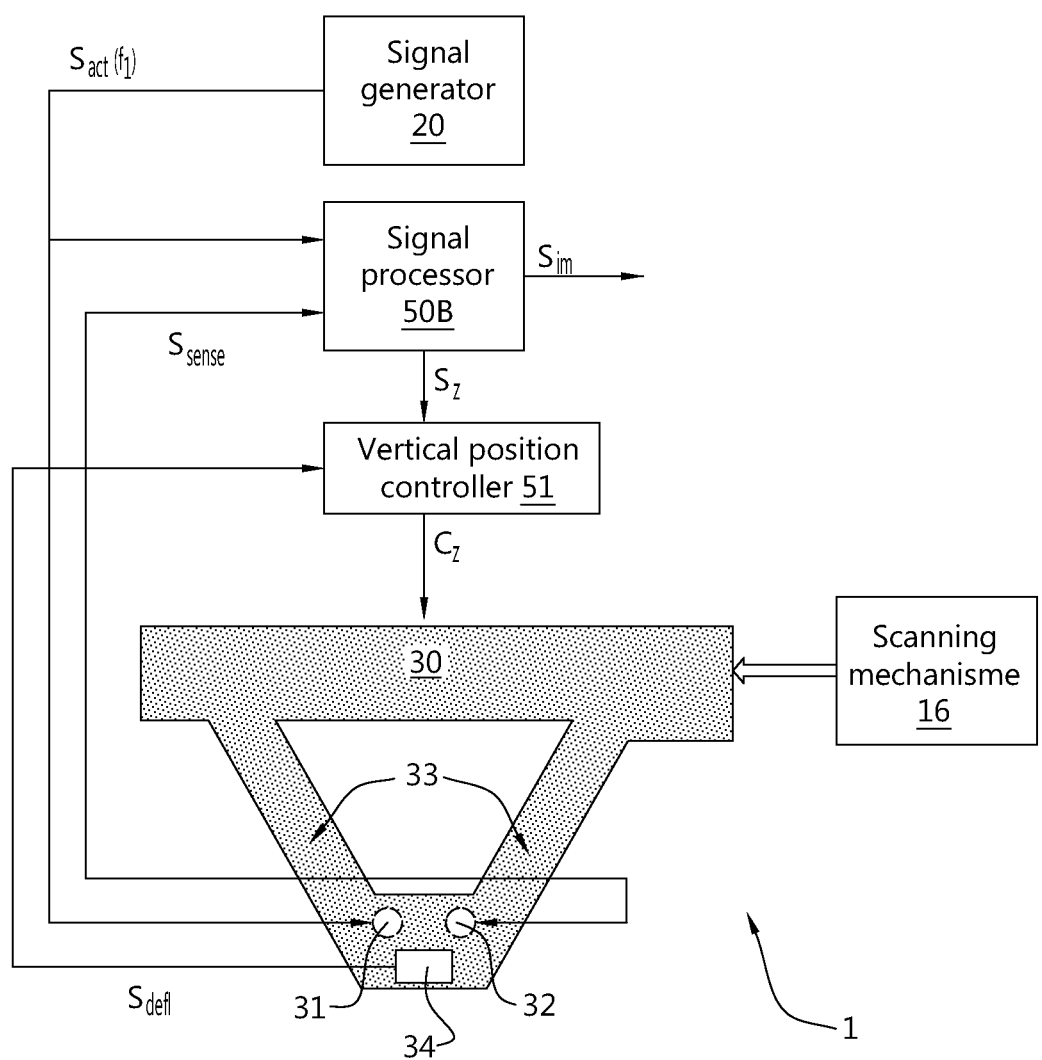
FIG. 3 schematically shows a third embodiment of an ultrasound acoustic microscopy device.

In the embodiment shown in FIG. 3, the cantilever 30 used in the scanning head 60 is provided with an AFM deflection measurement pad 34 that is accommodated on the surface 33 of the cantilever 30, arranged symmetrically with respect to the transmission tip 31 and the reception tip 32. The triangular shaped cantilever 30 can be manufactured relatively easily. In this case the controller 51 further receives a deflection signal $S_{defl}$ indicative for a torsion (left-right) of the cantilever in addition to the out-of-plane top-bottom signal $S_z$ which it receives from the signal processor 50B, to therewith measure and control a contact pressure of both tips 31, 32 simultaneously. Likewise, this is the case in the embodiment of FIG. 4. In this embodiment a first OBD measurement system comprising laser 40A and sensor 42A is provided to measure a deflection of the cantilever branch 33R, and a second OBD measurement system comprising laser 40B and sensor 42B is provided to measure a deflection of the cantilever branch 33L. The signals from sensors 42A, 42B and deflection sensor 34 are used by control unit 51 to control the height and the angle of the cantilever 30. The signal from sensors 42B at the receiver side is also used by signal processor 50B to derive the image signal.

Figure 5:
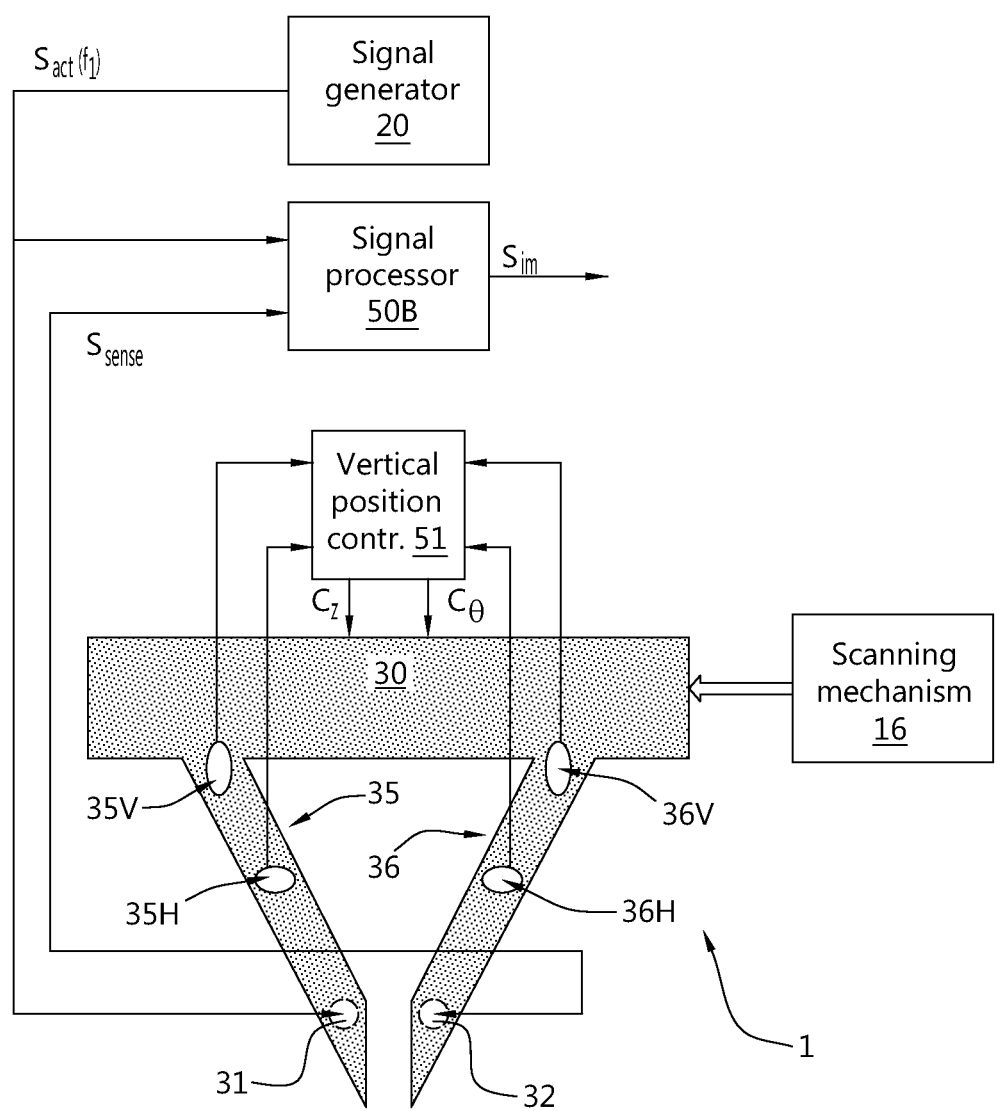
FIG. 5 schematically shows a fifth embodiment of an ultrasound acoustic microscopy device.
Figure 7:
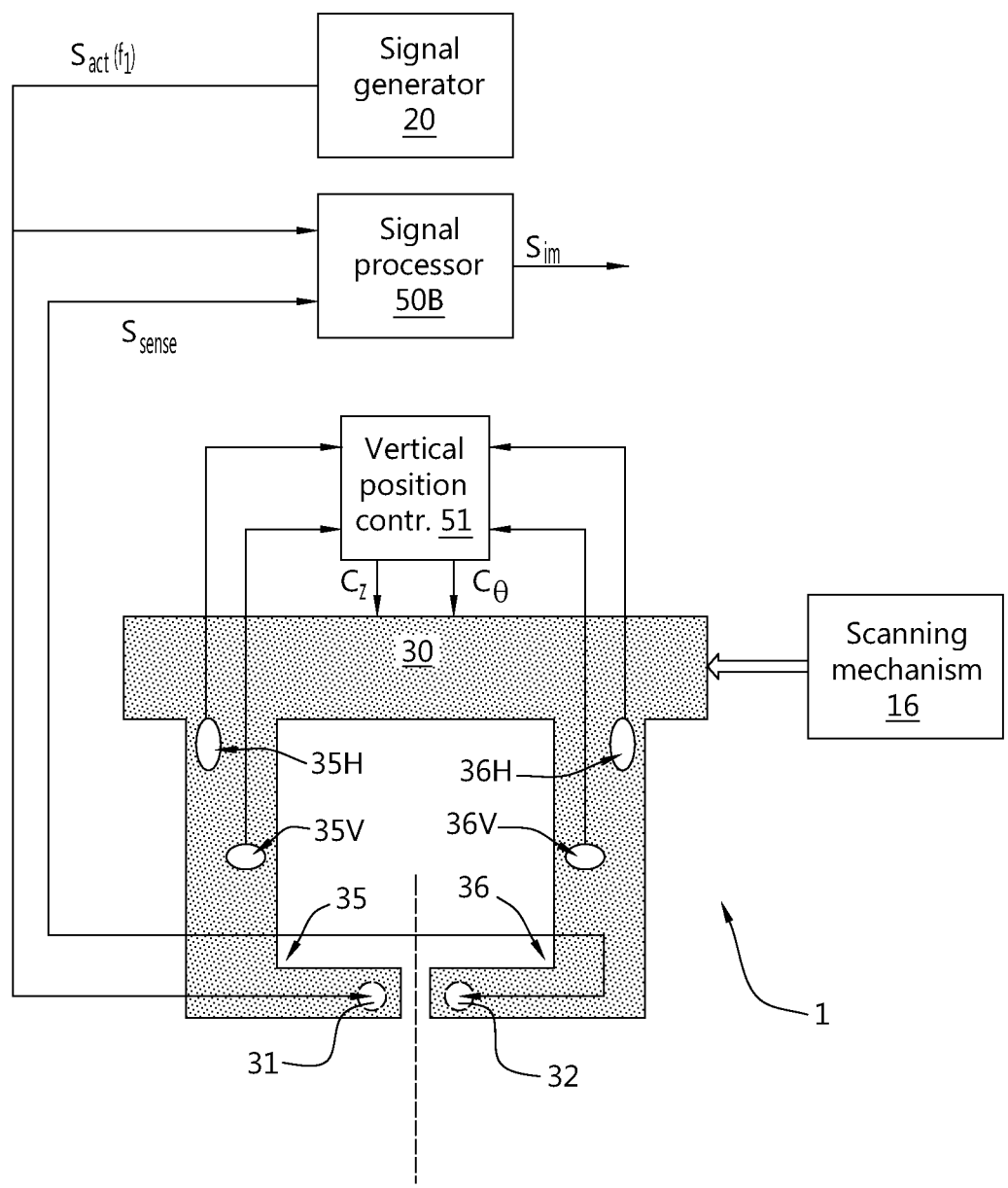
FIG. 7 schematically shows a seventh embodiment of an ultrasound acoustic microscopy device.

In the embodiments of FIG. 5-7, the transmission tip and the reception tip are accommodated on a surface of a respective cantilever branch facing in a direction of the carrier that is to carry the sample. Therewith not only the properties of the tips can be individually adapted, but also the properties of the cantilever branches can be individually adapted. Also their operational state, e.g. contact force can be individually controlled.

In the embodiment of FIG. 5, the cantilever is provided in the form of a triangle wherein one of the sides forms a common base portion and the other two sides form a respective cantilever branch 35, 36. Hence, contrary to the embodiment of FIG. 3, the legs of the triangle that extent from the common base portion are separate from each other at their ends, and each form a cantilever branch 35, 36. Cantilever branch 35 carries the transmission tip 31 and cantilever branch 36 carries the reception tip 32. In the embodiment shown, the controller 51 uses input signals from vertical deflection sensors 35V, 36V and from horizontal deflection sensors 35H, 36H. The controller 51 processes these signals to derive the vertical deflection of each of the cantilever branches 35, 36. Due to the fact that the cantilever branches 35, 36 extend in an oblique direction, vertical movements thereof also result in a torsion along a length axis of the cantilever branches, and a more precise estimation of the vertical movement of the cantilever branches at the position of its tip can be computed on the basis of each of its deflection sensors. The computation by the signal processor 51 may for example be on the basis of a theoretical model or on the basis of empirical data, e.g. using a polynomial approximation or a lookup table. It is noted that the cross-coupling between vertical movements and torsion is virtually absent in the embodiment of FIG. 3 due to the fact that these cross-coupling effects substantially cancel out therein.

The cantilever 30 of FIG. 5 can be manufactured relatively easily from the one as shown in FIG. 3. Starting from the closed triangle form as shown in FIG. 3, the triangle legs extending from the common base portion can be separated from each other at their ends, for example by a focused ion beam (FIB) method. Therewith the triangle leg 35 carrying the transmission tip 31 and the triangle leg 36 carrying the reception tip are mechanically decoupled from each other.

The cantilever 30 of FIG. 5 is even more favorable when applied in the embodiment shown in FIG. 6. In this case the operation of the reception tip 32 relies on a non-linear effect at the tip-sample interface of the reception tip. To improve the gain at the reception tip 32, the stiffness of the cantilever branch 36 may be dimensioned at a relatively low value as compared to that of the cantilever branch 35 carrying the transmission tip 31. This can for example be achieved in that the width of the cantilever branch 36 is less than a width of the cantilever branch 35. Also it may be contemplated to provide the cantilever branch 36 with a reduced thickness as compared to that of the cantilever branch 35.

Like the embodiments of FIGS. 5 and 6, an embodiment is provided in FIG. 7, wherein a cantilever 30 comprises a separate cantilever branch 35, 36 for the transmission tip 31 and the reception tip 32. In this case the cantilever branches 35, 36 are formed as mutually separated portions of a side of a quadrilateral, here a rectangle. The side of the quadrilateral is disconnected at a position between its ends joining a respective further side coupled to a common side. The transmission tip 31 and the reception tip 32 are arranged at a respective free end of a respective separated portion.

In this embodiment the properties of the cantilever branches 35, 36 can be even more easily adapted individually for optimization of transmission and reception. For example by having the separation at a position distant from a middle of the side, one of the cantilever branches has a relatively high stiffness which is advantageous for a transmission tip and the other one has a relatively low stiffness, which is favorable for use in combination with a reception tip that relies a non-linear interaction with the sample to provide for down-conversion. Also this embodiment is favorable as compared to the one of FIGS. 5 and 6, in that it allows for a mutually independent sensing of deflections of the cantilever branches in a vertical direction and in directions transverse thereto. The control means 51 is provided to control an angle of rotation θ along the axis y of the cantilever 30 respective to the sample with control signal $C_\theta$ and to control a height z respective to the sample with control signal $C_z$. The control means 51 may use input signals from deflection sensors 35H, 35V, 36H, 36V. Alternatively OBD systems may be provided to measure the deflection of the cantilever branches.

Figure 8:
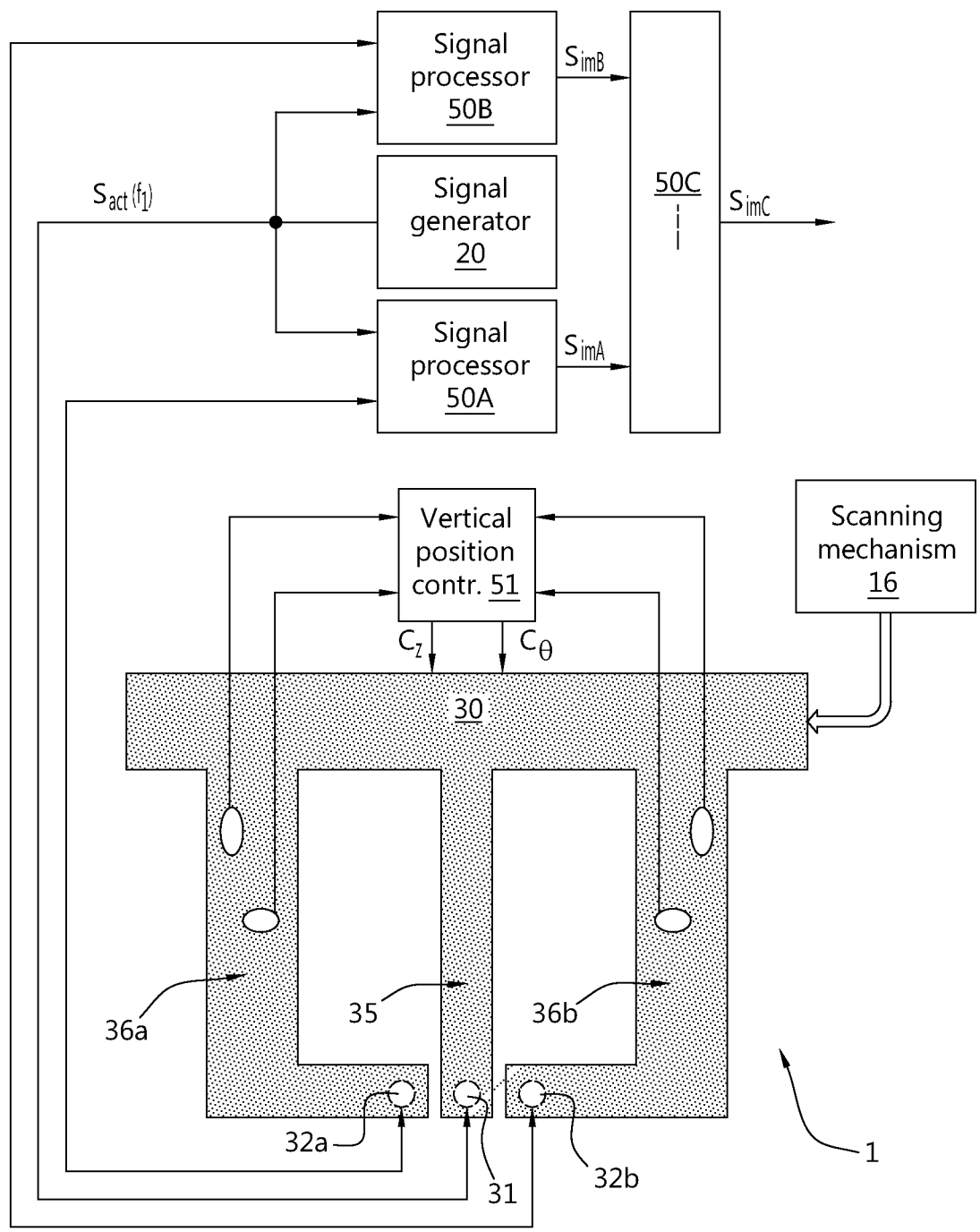
FIG. 8 schematically shows an eighth embodiment of an ultrasound acoustic microscopy device.

In the embodiment of FIG. 8, the cantilever 30 is provided with a plurality of reception tips 32a, 32b carried by cantilever branches 36a, 36b respectively. The cantilever 30 of FIG. 8 is a modification of the quadrilateral shaped cantilever of FIG. 7, in that it additionally comprises a further cantilever branch 35 that extends from the common side and between the free ends of the other two cantilever branches 36a, 36b. Hence a symmetric arrangement may be provided, wherein the additional cantilever branch 35 carries at its free end a transmission tip 31 and the other two cantilever branches 36a, 36b each carry a reception tip 32a, 32b. The reception tips may be configured to sense mutually different harmonics of the excitation signal. Additionally or alternatively, the reception tips may be configured to sense mutually different wave modes created by diffraction/interaction with the buried features. In the embodiment shown, signal processor 50A derives a first image signal $S_{imA}$ using the output signal from reception tip 32a and signal processor 50B derives a second image signal $S_{imB}$ using the output signal from reception tip 32b. It could also be contemplated to arrange one of the reception tips as an indirect reception tip that relies on a down-conversion in the tip-sample interface.

A third signal processor 50C receives the output signals from the signal processors 50A, 50B, to reconstruct an output image signal $S_{imB}$.

Figure 9:
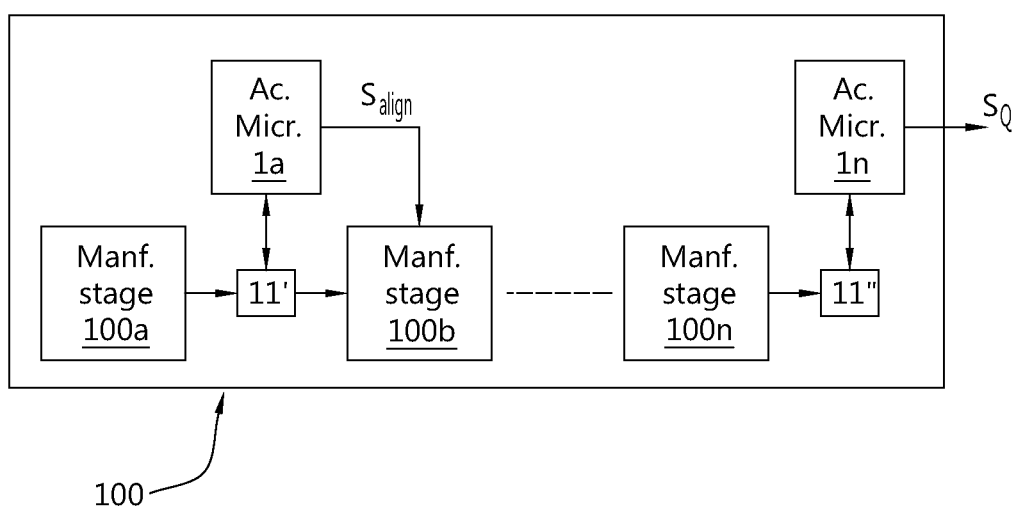
FIG. 9 schematically shows a lithographic apparatus.

FIG. 9 schematically shows a lithographic system 100 for manufacturing of a multilayer semiconductor device. The lithographic system 100 comprises an ultrasound acoustic microscope device 1a, for example in one of the embodiments specified above. The lithographic system is arranged to manufacture the semiconductor device in mutually subsequent manufacturing stages 100a, 100b, . . . 100n. The mutually subsequent manufacturing stages 100a, 100b, . . . 100n at least comprise a first manufacturing stage 100a and a second manufacturing stage 100b. The ultrasound acoustic microscope device 1a is arranged to inspect a semi-finished product 11' obtained in the first manufacturing stage 100a as the sample and to provide an analysis signal $S_{align}$ indicative for a position of sub-surface features in the semi-finished product 11'. The lithographic system 100 is arranged to use the analysis signal $S_{align}$ for alignment of the semi-finished product 5' in the second manufacturing stage 100b. In the embodiment of FIG. 9, the lithographic system 100 comprises a further ultrasound acoustic microscope device 1n that analyzes a quality of the multilayer semiconductor device 11" and provides an output signal $S_Q$ indicative for said quality. The output signal $S_Q$ may be provided as a binary signal that indicates whether or not the quality of the semiconductor device meets predetermined requirements. Alternatively, or in addition the output signal SQ may provide diagnostic information enabling an operator of the lithographic system to improve its operation.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. For example, any number of additional acoustic input signals may be applied, either to the sample or to the probe tip, without departing from the claimed invention. Also, the present invention may be combined with additional measurement techniques to obtain additional information from the combination of these. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:
1. An ultrasound acoustic microscopy device comprising:
a carrier for carrying a sample;
a signal generator configured to generate an actuation signal having a frequency of at least 1 GHz to be converted into an ultrasound acoustic signal for transmission;
a scanning head including a cantilever with separate tips for transmitting an acoustic wave into the sample and for receiving acoustic waves reflected from features within the sample, the separate tips comprising:
a transmission tip configured to contact a sample to transmit the ultrasound acoustic signal as an ultrasound acoustic wave into the sample, and
a reception tip, separate from the transmission tip, to contact the sample to receive an acoustic signal resulting from reflections of the ultrasound acoustic wave from within the sample;
a signal processor configured to generate an image signal in response to a sensor signal generated in response to the acoustic signal resulting from reflections received by the reception tip; and
a scanning mechanism configured to displace the scanning head relative to the sample, along a surface of the sample,
wherein the reception tip is configured to receive the reflection as the acoustic signal to be converted into the sensor signal, and
wherein the transmission tip and/or elements acoustically coupled therewith are of a construction or have dimensions different from the reception tip and/or elements acoustically coupled therewith.
2. The ultrasound acoustic microscopy device according to claim 1, wherein the transmission tip and the elements acoustically coupled therewith have a resonance frequency differing from that of the receiving element and the elements acoustically coupled therewith.
3. The ultrasound acoustic microscopy device according to claim 1, wherein the transmission tip is acoustically coupled to a piezo electric element of a first piezo electric material, and
wherein the reception tip is acoustically coupled to a piezo-electric element of a second piezo electric material that is different from the first piezo electric material.
4. The ultrasound acoustic microscopy device according to claim 1, wherein the transmission tip and the reception tip are accommodated at mutually different positions on a same surface of the cantilever that is facing in a direction of the carrier.
5. The ultrasound acoustic microscopy device according to claim 1, wherein the transmission tip and the reception tip are accommodated on a surface of a respective cantilever branch of the cantilever facing in a direction of the carrier.
6. The ultrasound acoustic microscopy device according to claim 1, comprising a plurality of reception tips.
7. The ultrasound acoustic microscopy device according to claim 1, wherein the actuation signal is provided as a continuous signal.
8. The ultrasound acoustic microscopy device according to claim 1, wherein the actuation signal is provided as a pulsed signal.
9. A lithographic system including at least one of the ultrasound acoustic microscopy device of claim 1.
10. An ultrasound acoustic microscopy device comprising:
a carrier for carrying a sample;
a signal generator configured to generate an actuation signal having a frequency of at least 1 GHz to be converted into an ultrasound acoustic signal for transmission;
a scanning head including a cantilever with separate tips for transmitting an acoustic wave into the sample and for receiving acoustic waves reflected from features within the sample, the separate tips comprising:
a transmission tip configured to contact a sample to transmit the ultrasound acoustic signal as an ultrasound acoustic wave into the sample, and
a reception tip, separate from the transmission tip, to contact the sample to receive an acoustic signal resulting from reflections of the ultrasound acoustic wave from within the sample;
a signal processor configured to generate an image signal in response to a sensor signal generated in response to the acoustic signal resulting from reflections received by the reception tip; and
a scanning mechanism configured to displace the scanning head relative to the sample, along a surface of the sample,
wherein the transmission tip and the reception tip are accommodated at mutually different positions on a same surface of the cantilever that is facing in a direction of the carrier,
wherein additionally, an atomic force microscopy (AFM) deflection measurement pad is accommodated on the surface of the cantilever, the AFM deflection measurement pad being arranged symmetrically with respect to the transmission tip and the reception tip.
11. A lithographic system including at least one of the ultrasound acoustic microscopy device of claim 10.
12. The ultrasound acoustic microscopy device according to claim 10, wherein the actuation signal is provided as a continuous signal.
13. The ultrasound acoustic microscopy device according to claim 10, wherein the actuation signal is provided as a pulsed signal.
14. The ultrasound acoustic microscopy device according to claim 10, wherein the transmission tip and the reception tip are accommodated on a surface of a respective cantilever branch of the cantilever facing in a direction of the carrier.

15. An ultrasound acoustic microscopy device comprising:
- a carrier for carrying a sample;
- a signal generator configured to generate an actuation signal having a frequency of at least 1 GHz to be converted into an ultrasound acoustic signal for transmission;
- a scanning head including a cantilever with separate tips for transmitting an acoustic wave into the sample and for receiving acoustic waves reflected from features within the sample, the separate tips comprising:
  - a transmission tip configured to contact a sample to transmit the ultrasound acoustic signal as an ultrasound acoustic wave into the sample, and
  - a reception tip, separate from the transmission tip, to contact the sample to receive an acoustic signal resulting from reflections of the ultrasound acoustic wave from within the sample;
- a signal processor configured to generate an image signal in response to a sensor signal generated in response to the acoustic signal resulting from reflections received by the reception tip; and
- a scanning mechanism configured to displace the scanning head relative to the sample, along a surface of the sample, wherein the signal generator is configured to generate a further actuation signal having a further frequency of at least 1 GHz, different from the frequency, and wherein the acoustic signal to be converted is a difference acoustic signal having a frequency corresponding to a difference in the frequency and the further frequency, resulting from a non-linear interaction of the reflections with a further ultrasound signal generated in response to the further actuation signal.

16. The ultrasound acoustic microscopy device according to claim 15, wherein a pressure exerted by the reception tip is lower than a pressure exerted by the transmission tip.

17. A lithographic system including at least one of the ultrasound acoustic microscopy device of claim 15.

18. The ultrasound acoustic microscopy device according to claim 15, wherein the actuation signal is provided as a continuous signal.

19. The ultrasound acoustic microscopy device according to claim 15, wherein the actuation signal is provided as a pulsed signal.

20. The ultrasound acoustic microscopy device according to claim 15, wherein the transmission tip and the reception tip are accommodated on a surface of a respective cantilever branch of the cantilever facing in a direction of the carrier.

* * * * *